Jan. 10, 1967   P. E. ROBINSON   3,297,052
ROTARY VALVE
Filed April 9, 1965   2 Sheets-Sheet 1
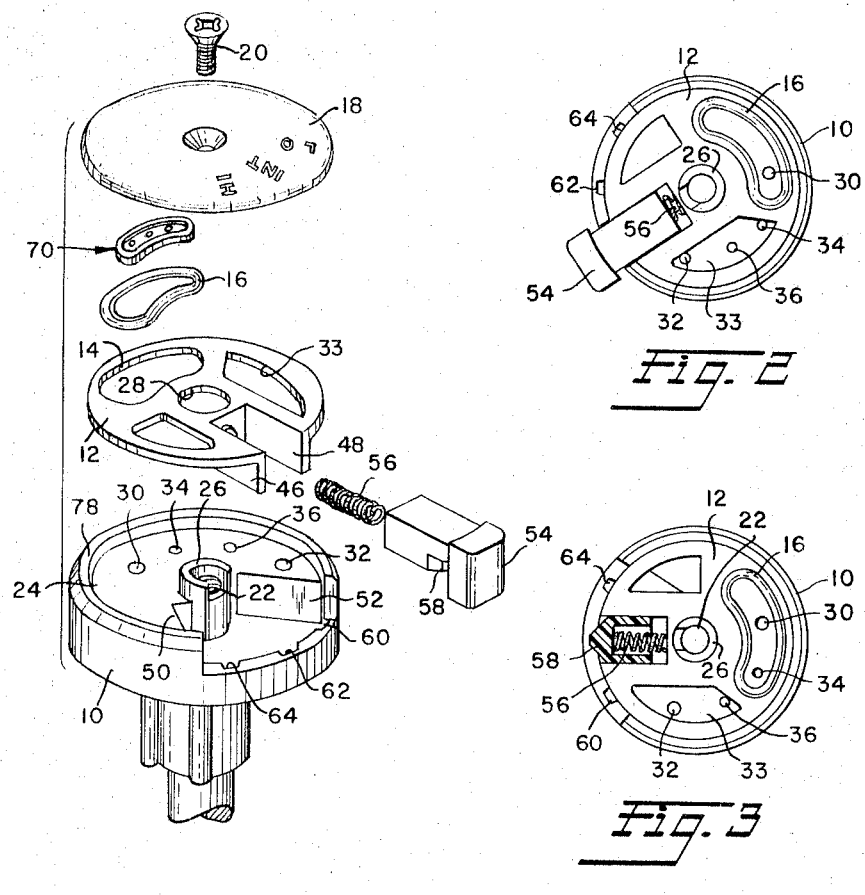
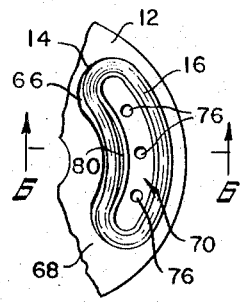
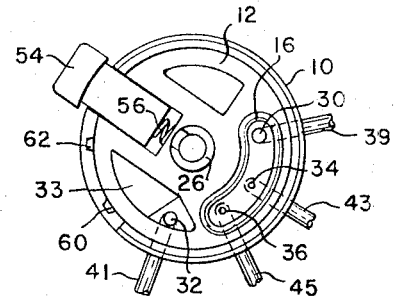
INVENTOR
PHILLIP E. ROBINSON
BY
Scrivener Parker Scrivener & Clarke
ATTORNEYS Jan. 10, 1967 P. E. ROBINSON 3,297,052
ROTARY VALVE
Filed April 9, 1965 2 Sheets-Sheet 2
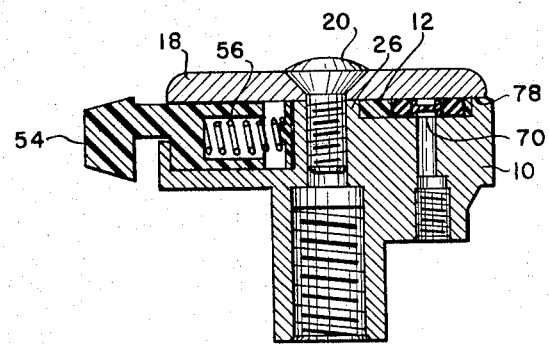
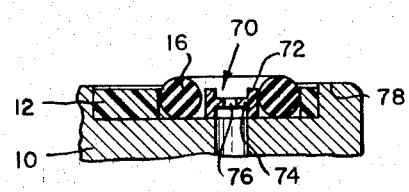
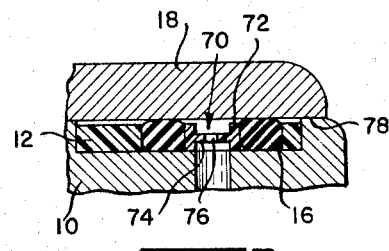
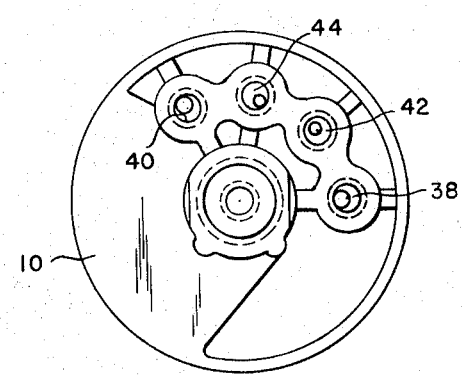
INVENTOR
PHILLIP E. ROBINSON
BY
Scrivener Parker Scrivener & Clarke
ATTORNEYS 3,297,052
ROTARY VALVE
Phillip E. Robinson, Cleveland Heights, Ohio, assignor, by mesne assignments, to Eaton Manufacturing Company, Cleveland, Ohio, a corporation of Ohio
Filed Apr. 9, 1965, Ser. No. 446,826
10 Claims. (Cl. 137—625.21)

This invention relates to valve mechanism and more particularly to a valve of the rotary disc type for controlling the flow of fluid pressure to and from one or more pressure activated motors.

The principal object of the present invention is to provide a rotary type disc valve which is so constructed as to avoid any leakage between the various fluid pressure control openings of the valve as the latter is moved to different control positions.

A further object of the invention is to provide a rotary valve wherein the operative parts thereof are so constructed and arranged that expensive machining and lapping operations of such parts for the purpose of preventing leakage of fluid therebetween is unnecessary.

Another object is to provide in a valve of the above character, a novel shear type of valve element which is carried by the rotary disc and which effectively controls the flow of fluid through the selected valve ports without danger of leakage.

A still further object is to provide a valve element of rubbery material in combination with an insert, the construction being such that when the valve parts are assembled, the valve element is compressed between the valve body and plate to provide an effective valve seal and wherein the degree of compression is predetermined by the shape and contour of the valve insert and the recess in which the valve element is positioned. A still further object is to provide a valve which is readily serviceable with a screwdriver or similar simple tool, without disconnecting conduits or removing the valve from its mounting; also the valve can be restored to original serviceable operation by replacement of an inexpensive valve element.

Other objects and novel features of the invention will appear more fully hereinafter from a consideration of the following detailed description when taken in connection with the accompanying drawings which are illustrative of one form of the invention. It will be expressly understood however, that the drawings are utilized for purposes of illustration only and are not to be taken as a definition of the limits of the invention, reference being had for this purpose to the appended claims.

Referring to the drawings wherein similar reference characters refer to like parts throughout the several views:

FIG. 1 is an exploded view of the parts of a rotary valve constructed in accordance with the principles of the present invention;

FIGS. 2, 3 and 4 are plan views of the valve, with the cover plate and valve insert removed and illustrating the valve in three positions of adjustment;

FIG. 5 is a fragmentary plan view of the rotor disc and illustrates the manner of initial assembly of the shear type valve element and the valve insert, the cover plate being removed;

FIG. 6 is an enlarged partial sectional view of the valve parts shown in FIG. 5 and taken along line 6—6 of the latter;

FIG. 7 is an enlarged partial sectional view similar to FIG. 6 with the addition of the cover plate and illustrates the compressed and operative condition of the shear type valve element;

FIG. 8 is a transverse sectional view of the valve in assembled condition, and

FIG. 9 is a bottom view of the valve and illustrates the location of the valve openings.

Referring more particularly to FIG. 1, the present invention is illustrated therein as comprising a valve body 10 in which a rotor disc 12 is rotatably mounted, the latter being provided with a generally arcuate shaped valve recess 14 for receiving a shear type valve element 16 and the aforementioned parts being assembled in the manner shown in FIG. 8 and being maintained in operative position by means of a cover plate 18 and a screw 20 which is received within a threaded opening 22 in the body. The body 10 is provided with a flat face 24 upon which the rotor disc 12 is mounted, the latter being rotatable about a hub 26 receivable within an opening 28 provided in the disc. Inlet and exhaust ports 30 and 32 respectively as well as outlet ports 34 and 36 terminate in the face 24 and such ports extend through the body to openings 38, 40, 42 and 44 respectively for connection in the system with which the valve may be used by means of conduits 39, 41, 43 and 45, FIGS. 4 and 9. The rotor disc 12, which is preferably made of plastic material, is provided with depending flanges 46 and 48 which respectively engage abutments 50 or 52 to act as stops to limit the extent of rotation of the disc in opposite directions.

In order to rotate the rotor disc 12 to its various positions of adjustment, a manually operable handle 54 is positioned within the space between the flanges 46 and 48 and is resiliently urged outwardly by a spring 56 so that a detent 58 formed on the handle may selectively engage notches 60, 62 or 64 formed on the body 10. Thus, as the handle 54 and rotor disc 12 are moved between the abutment 50 and 52, the position of the disc may be readily adjusted to a selected one of three positions for the purpose of controlling the flow of fluid between the valve ports 30, 32, 34 and 36. FIG. 2 shows the position of the rotor disc 12 with the outlet ports 34 and 36 connected with the exhaust port 32 through recess 33; FIG. 3 shows the position where the outlet port 36 is connected with the exhaust port 32 and with the inlet port 30 connected with the outlet port 34, while FIG. 4 illustrates the position of the parts when both the outlet ports 34 and 36 communicate with the inlet port 30.

One of the important features of the present invention resides in the use of the novel shear valve element 16 which is so arranged as to effectively control the fluid flow between the valve ports in the face 24 of the body member 10 without danger of undesired leakage therebetween. As shown, see FIGS. 5, 6 and 7, the valve element 16 comprises an O-ring of rubbery material, having a circular cross-section and which is readily deformed to fit within the arcuate or kidney-shaped valve recess 14 of the rotor disc 12. More particularly, the size of the O-ring forming the valve element 16 is such that when in operative position, clearance spaces 66 and 68 are provided at opposite ends of the valve element between the latter and the adjacent sides of the valve recess 14.

A further feature of the invention includes the use of a valve insert 70 which is generally of the same form as recess 14 and fits within the interior space defined by the valve element 16 when the latter is in operative position, see FIGS. 5 and 6. Insert 70 is preferably formed as an integral member of plastic material and includes a circumferential rim 72 and a central web 74, the latter being provided with one or more pressure equalization openings 76. The axial width of the rim 72 is preferably equal to the thickness of the rotor disc 12 and such dimension is slightly less than that of the circumferential rim 78 and hub 26 of the body 10 as will be clearly observed from FIGS. 6 and 7. Due to this construction, friction between the insert 70 and the rotor disc 12 on the one hand and the cover plate 18 on the other during operation of the valve is avoided.

The area defined by the insert 70 is somewhat less than the interval area of the valve element 16 so that after the assembly of the latter within the valve recess 14, it will be seen that a clearance 80 exists between the valve element and the insert, see FIG. 5. It will also be noted from FIG. 6 that the diameter of the valve element 16 is slightly greater than the axial width of the circumferential rim 78 so that the valve element extends slightly above the plane of the upper surface of the circumferential rim 78.

With the parts in position as above set forth, it is only necessary to assemble the cover plate 18 and tighten the screw 20. When this occurs, the valve element 16 is compressed, see FIG. 7, and since such element and the valve insert 70 are freely mounted within the valve recess 14 these parts will adjust their positions so that the clearances or spaces 66, 68 and 80 will be taken up as the valve element is compressed. When the valve plate firmly contacts the upper surface of the circumferential rim 78 of the body 10, it will be understood that the valve element 16 will be compressed to such a degree that the exterior surface thereof may contact the wall of the valve recess 14 while the interior surface thereof may firmly engage the valve insert 70. Also, since the valve element 16 is firmly compressed between the cover plate 18 and the face 24 of the body 10, a highly effective valve seal is provided which eliminates undesirable leakage between the valve ports during operation of the valve.

It will also be understood from the foregoing, that the use of the valve insert 70 performs the desirable function of predetermining the degree of compression as well as the resulting contour of the valve element 16 during assembly of the cover plate 18, in order to provide an effective valve seal. The insert also prevents the possibility of distortion of the valve element in the event the rotor disc 12 is operated in the absence of fluid pressure at the inlet port 30. Openings 76 assure constant fluid pressure equalization on opposite sides of the insert 70 as well as equal pressure distribution upon all portions of the valve element 16 in order to force the latter into firm contact with the wall of the valve recess 14.

The present invention thus provides a relatively simple rotary valve device including a shear type of valve which secures an effective control of fluid flow without the necessity of resorting to costly lapping and machining operations. The use of the novel insert for the valve effectively predetermines the degree of compression thereof as well as assuring the maintenance of the valve contour or configuration for most efficient operation. Ease of servicing the valve is readily achieved by merely removing the cover plate.

While one embodiment of the invention has been shown and described herein with considerable particularity, it will readily be apparent to those skilled in the art that various changes may be made therein without departing from the spirit of the invention. Reference will therefore be had to the appended claims for a definition of the invention.

What is claimed is:

1. A rotary valve for controlling the flow of fluid pressure comprising a body having a cylindrical portion provided with a flat face, an upstanding rim around said face, a centrally positioned hub extending upwardly from said face, inlet, outlet and exhaust ports terminating at said face, and means for controlling the flow of fluid pressure between said ports comprising a rotor disc positioned on said face and rotatable about said hub, said disc having a generally arcuate shaped valve recess, an O-ring valve element formed of rubbery material deformed and confined within said valve recess, the thickness of said O-ring being greater than the height of said upstanding rim, a cover plate secured to said body in contact with said upstanding rim, said O-ring being thereby compressed between said cover plate and said face, and co-operating means on said body and said rotor disc for limiting the extent of movement of said rotor disc and valve element with respect to said body.

2. A rotary valve as set forth in claim 1 wherein the area of said valve recess is slightly greater than the area defined by the exterior surface of said valve element when the latter is confined within said valve recess and is in its non-compressed state.

3. A rotary valve as set forth in claim 2 wherein the thickness of that portion of the rotor disc positioned on said face is slightly less than the height of said upstanding rim.

4. A rotary valve as set forth in claim 3 which includes a generally arcuate shaped valve insert positioned within the area defined by the interior surface of said valve element when the latter is confined within said valve recess.

5. A rotary valve as set forth in claim 4 wherein said area defined by the interior surface of said valve element is slightly greater than the area of said valve insert when the valve means is in its non-compressed state.

6. A rotary valve comprising a cylindrical body portion having a flat face surrounded by an upstanding marginal rim, said face provided with inlet, outlet and exhaust ports for controlling the flow of fluid pressure, and said face having a recess bounded by a pair of spaced-apart abutments, a rotor disc mounted for rotary movement on said face and having a pair of parallel depending flanges positioned in said recess for respective engagement with said abutments to limit rotary movement of said disc in opposite directions with respect to said body portion, a manually operable handle positioned between said flanges, a detent formed on said handle, a plurality of spaced notches formed in said body portion, resilient means normally urging said handle outwardly to bring said detent into a selected notch as the handle and rotor disc are rotated with respect to said body portion, a generally arcuate shaped valve recess formed in said rotor disc, and an O-ring valve element formed of rubbery material deformed and confined within said valve recess, the thickness of said O-ring being greater than the height of said upstanding rim, a cover plate secured to said body portion in contact with said upstanding rim, said O-ring being thereby compressed between said cover plate and said face.

7. A rotary valve as forth in claim 6 wherein the area of said valve recess is slightly greater than the area defined by the exterior surface of said valve element when the latter is confined within said valve recess and is in its non-compressed state.

8. A rotary valve as set forth in claim 7 wherein the thickness of that portion of the rotor disc positioned on said face is slightly less than the height of said upstanding rim.

9. A rotary valve as set forth in claim 7 which includes a generally arcuate shaped valve insert positioned within the area defined by the interior surface of said valve element when the latter is confined within said valve recess.

10. A rotary valve as set forth in claim 9 wherein said area defined by the interior surface of said valve element is slightly greater than the area of said valve insert when the valve means is in its non-compressed state.

References Cited by the Examiner

UNITED STATES PATENTS 2,908,293  10/1959  Johnson _____ 137—625.46

FOREIGN PATENTS 1,140,555  12/1962  Germany.

M. CARY NELSON, *Primary Examiner.*

R. J. MILLER, *Assistant Examiner.*